2,769,813
CARBOXYMETHYL QUATERNARY AMMONIUM HALIDES, HYDRAZIDES AND HYDRAZONES WITH THIOPHENECARBOXALDEHYDES

Edward C. Hermann, Wilmington, Del., assignor to E. I. du Pont de Nemours and Company, Wilmington, Del., a corporation of Delaware No Drawing. Application May 18, 1951, Serial No. 227,118

6 Claims. (Cl. 260—295)

This invention relates to thiophenecarboxaldehyde carboxymethyl quaternary ammonium halide hydrazide hydrazones and their solvates and to methods for their preparation.

The thiophenecarboxaldehyde carboxymethyl quaternary ammonium halide hydrazide hydrazones of the invention are represented by the formula 1.
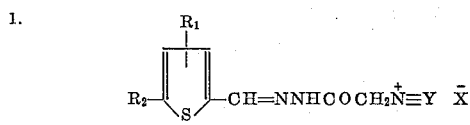

where $R_1$ and $R_2$ are members of the class consisting of hydrogen, bromine, nitro, and alkyl, radicals, $(N\equiv Y)$ is a quaternary ammonium radical and X is a member of the group consisting of chlorine and bromine.

The compounds of the invention are prepared by reacting a thiophenecarboxaldehyde with an aminoacetohydrazide hydrohalide represented by the formula 2.
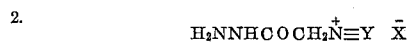

where $(N\equiv Y)$ and X have the same significance as stated above, in the presence of a solvent.

It will be understood that the grouping $(N\equiv Y)$ may be any of a wide variety of quaternary systems. For instance, Y may represent a trialkyl radical, such as trimethyl or triethyl and the like. Y may represent other radicals such as a mixed aryl alkyl radical, for example, phenyl dimethyl or a mixed alkyl alkylene radical, for example, dimethyl allyl. $(N\equiv Y)$ may also represent an unsaturated heterocyclic group such as, for instance, the pyridinium radical or the morpholinium radical. The trimethyl and pyridinium radicals are preferred.

The aminoacetohydrazide hydrohalides used in the preparation of the compounds of the invention and represented by Formula 2 are preferably members of the group consisting of Girard's T reagent and Girard's P reagent. These reagents are commercially available. Girard's T reagent (trimethylaminoacetohydrazide hydrochloride, also known as betaine hydrazide hydrochloride) can be readily prepared by reacting ethyl chloroacetate and trimethylamine with hydrazine hydrate by the procedure described on page 85 of "Organic Syntheses," collective volume 2, John Wiley & Sons, Inc., New York, 1943.

Girard's P reagent can be represented graphically by Formula 2 wherein $(N\equiv Y)$ is a pyridinium radical. It is prepared in a manner identical with the method already described for Girard's T reagent with the exception that pyridine is used in place of trimethylamine.

The thiophenecarboxaldehydes which may be reacted with an aminoacetohydrazide hydrohalide to produce the compounds of my invention are represented by the formula 3.
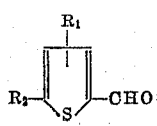

where $R_1$ and $R_2$ are alike or different and have the same significance as in Formula 1. Preferably the alkyl is lower alkyl, that is 1 to 5 carbon atoms inclusive.

Illustrative of the thiophenecarboxaldehydes used in the preparation of the compounds of the invention are 5-methyl - 2 - thiophenecarboxaldehyde, 5 - bromo - 2-thiophenecarboxaldehyde, 5 - nitro - 2 - thiophenecarboxaldehyde, and thiophenecarboxaldehyde.

The thiophenecarboxaldehydes represented by Formula 3 and used in the processes of the invention may be prepared by several methods. The method selected will, of course, depend upon the thiophenecarboxaldehyde desired. In other words, the method of preparing compounds of Formula 3 will vary depending upon the substituents $R_1$ and $R_2$ desired on the thiophene nucleus.

The preparation of substituted 2-thiophenecarboxaldehydes where, for instance, $R_1$ is hydrogen or lower alkyl and $R_2$ is hydrogen, halogen or lower alkyl, is specifically mentioned and described in my copending application Serial No. 179,395, filed August 14, 1950 now Patent No. 2,662,087. In brief, the method involves reacting an appropriately substituted known thiophene, such as, for instance, 2 - methylthiophene or 2 - bromothiophene, with N-methylformanilide in the presence of a phosphorus oxyhalide.

Similarly, the dihalogen substituted 2 - thiophenecarboxaldehydes may be prepared by reacting the appropriately substituted known thiophene compounds with N-methylformanilide in the presence of a phosphorus oxyhalide.

The preparation of 5 - nitro - 2 - thiophenecarboxaldehyde, a preferred reactant, is fully described and claimed in my copending application Serial No. 227,117, filed concurrently herewith, now Patent No. 2,680,117. Briefly, the process comprises hydrolyzing nitrated 2 - thiophenemethanediol diacetate with aqueous sulfuric acid to give the desired 5 - nitro - 2 - thiophenecarboxaldehyde. The diacetate used in this process is readily prepared from 2-thiophenecarboxaldehyde.

The reaction between the thiophenecarboxaldehyde and the aminoacetohydrazide is most readily carried out in the presence of a solvent. While any of a wide variety of normally liquid alcoholic solvents may be used, it is preferred to employ an aliphatic monohydric lower alcohol, such as, for instance, methanol, ethanol, propanol, isopropanol, butanol and the like. Absolute ethanol is a particularly preferred solvent for the reaction.

As catalysts for the reaction between the thiophenecarboxaldehyde and the aminoacetohydrazide hydrohalide, there may be used any aliphatic monocarboxylic acid. The lower acids such as, for instance, acetic, propionic, butyric and valeric, are preferred. Of these, glacial acetic acid is especially preferred.

The reaction may also be facilitated by moderate heating, say, by maintaining the reactants at a temperature of about 60°–100° C. The precise temperature employed will depend upon the particular reactants and solvent. As a practical matter, the reaction between the thiophenecarboxaldehyde and the hydrohalide is usually carried out at or slightly under the boiling point of the solvent.

Usually a reaction period of from 15 minutes to several hours is required, but in some instances the reaction may go to completion within a short time even at room temperature.

The solvates of the compounds are prepared by simply crystallizing the compounds from solvents. The preferred solvents for crystallization of the compounds of the invention are the lower alkanols, such as, for instance, methanol, ethanol, propanol and the like. Of these, I particularly prefer ethanol. While the alcoholic solvates are most frequently prepared, other solvates, for instance, the hydrates, may be prepared. The term "solvate" is used herein to include all states of solvation. There may be prepared, for instance, the hemisolvate, the monosolvate, the disolvate, the trisolvate and the like.

Conversion of the solvate of the compounds of the invention to the compounds themselves is readily effected by treatment of the solvate with a liquid aromatic hydrocarbon, preferably benzene. The product which separates from the benzene suspension of the solvate after a period of heating is substantially free of any alcohol of solvation.

The compounds of the present invention are crystalline solids usually light in color. They are, in general, soluble in water, methanol and glacial acetic acid, but insoluble in acetone and ether.

The thiophene carboxaldehyde carboxymethyl quaternary ammonium halide hydrazide hydrazones and their solvates are particularly valuable because of their pesticidal properties. Some of the compounds of the present invention have given evidence of value as bactericides, fungicides and protozoacides. The compounds are also useful in the treatment of cecal coccidiosis in chickens.

The following examples illustrate typical compounds of the invention and methods for their preparation. Parts are by weight unless otherwise indicated.

EXAMPLE 1

(Carboxymethyl)trimethylammonium chloride, hydrazide and hydrazone with 5-nitro-2-thiophenecarboxaldehyde

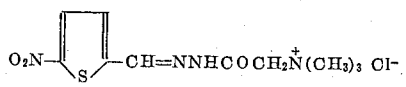

To a solution consisting of 15.7 parts of 5-nitro-2-thiophenecarboxaldehyde (M. P. 73–74° C.) and 19.7 parts of hot absolute ethanol, there is added a mixture consisting of 16.7 parts of Girard's T reagent, 129.7 parts of absolute ethanol and 10.5 parts of glacial acetic acid. A yellow precipitate was formed immediately. The suspension was heated at the temperature of reflux for a period of about one-half hour and subsequently cooled. The solid was collected and washed twice with 39.5 parts of absolute ethanol, twice with diethyl ether and dried. The product so obtained weighed 30.6 parts and melted at about 173° C. (with decomposition). Crystallization of the material from 150 parts by volume of a 50% aqueous alcoholic solution gave 23 parts of a compound melting at 173° C. (with decomposition), and having the following analysis:

*Analysis.*—Calcd. for $C_{10}H_{15}ClN_4O_3S$: Cl, 11.56; N, 18.26. Calcd. for $C_{10}H_{15}ClN_4O_3S+C_2H_5OH$: Cl, 10.05; N, 15.88. Found: Cl, 9.81; N, 15.63.

EXAMPLE 2

(Carboxymethyl)trimethylammonium chloride, hydrazide and hydrazone with 5-methyl-2-thiophenecarboxaldehyde

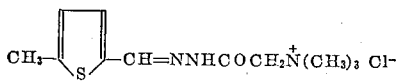

To a boiling solution consisting of 12.6 parts of 5-methyl-2-thiophenecarboxaldehyde (B. P. 62–63° C./0.3 mm.) and 19.7 parts of absolute ethanol, there was added a hot solution consisting of 18.4 parts of Girard's T reagent, 134 parts of absolute ethanol, and 17.8 parts of glacial acetic acid. The resulting solution was heated under reflux for a period of one-half hour, then treated with decolorizing charcoal and filtered. The crystalline product, which separated from the filtrate upon cooling, was collected on a filter, washed three times with 24.8 parts of absolute ethanol and twice with 24.8 parts of diethyl ether, and air-dried. The compound so obtained weighed 21 parts and has a melting point of 225° C. (decomposition).

*Analysis.*—Calcd. for $C_{11}H_{18}ClN_3OS$: N, 15.24. Calcd. for $C_{11}H_{18}ClN_3OS+\frac{1}{2}C_2H_5OH$: N, 14.06. Found: N, 14.02.

EXAMPLE 3

(Carboxymethyl)trimethylammonium chloride, hydrazide and hydrazone with 5-bromo-2-thiophenecarboxyaldehyde

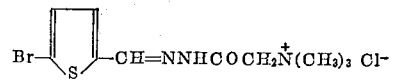

A hot solution consisting of 18.4 parts of Girard's T reagent, 134 parts of absolute ethanol, and 17.8 parts of glacial acetic acid was added to a boiling solution consisting of 19.1 parts of 5-bromo-2-thiophenecarboxaldehyde ($n_D^{25}$ 1.6314) and 19.7 parts of absolute ethanol. The resulting solution was heated at reflux temperature for a period of one-half hour, then treated with decolorizing carbon and filtered. The crystalline product, which separated from the filtrate on cooling, was collected on a filter, washed three times with 27.6 parts of absolute ethanol and twice with 24.8 parts of ether, and air-dried. 24 parts of product (M. P. 212° dec.) was obtained.

*Analysis.*—Calcd. for $C_{10}H_{15}BrClN_3OS$: N, 12.33. Found: N, 12.06.

EXAMPLE 4

(Carboxymethyl)trimethylammonium chloride, hydrazide and hydrazone with 2-thiophenecarboxaldehyde

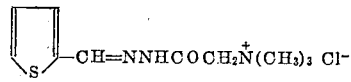

To a boiling solution consisting of 11.2 parts of 2-thiophenecarboxaldehyde (redistilled, B. P. 97–98° C./30 mm.) there was added a hot solution consisting of 18.4 parts of Girard's T reagent, 134 parts of absolute ethanol, and 17.8 parts of glacial acetic acid. The resulting solution was heated at a temperature which caused the ethanol to reflux. Within a period of two minutes a crystalline precipitate formed. The resulting suspension was heated under reflux for a period of one-half hour and then cooled. The crystalline material was separated by filtration, collected, washed three times with 27.6 parts of absolute ethanol and twice with 24.8 parts of ether, and air-dried. The product so obtained weighed 25 parts. Its melting point was 243° C.

*Analysis.*—Calcd. for $C_{10}H_{16}ClN_3OS$: N, 16.05. Found: N, 16.20.

EXAMPLE 5

1-(carboxymethyl)pyridinium chloride, hydrazide and hydrazone with 2-thiophenecarboxaldehyde

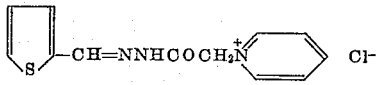

To a boiling solution consisting of 11.2 parts of 2-thiophenecarboxaldehyde (redistilled, B. P. 97–98° C./30 mm.) and 19.7 parts of absolute ethanol there was added a hot solution consisting of 20.0 parts of Girard's P reagent, 197.3 parts of absolute ethanol, and 52.5 parts of glacial acetic acid. The resulting solution was heated at a temperature of about 100° C. for a period of one-half hour, then treated with carbon and filtered. The filtrate was concentrated to approximately one-half its original volume by evaporation in a stream of nitrogen. The small amount of solid which separated during this concentration was dissolved on warming the concentrate on a steam bath. The concentrate was allowed to cool slowly overnight. The crystalline product which separated on cooling was separated by filtration, collected, washed twice with 15.8 parts of absolute ethanol and twice with 26.2 parts of ether, and air-dried. Yield, 16 parts, M. P. 235° C. decomposition. (Product melted at 150° C. when placed on melting point block at that temperature.)

A second crop of product, amounting to 8 parts, M. P. 235° C. (dec.), was recovered from the combined filtrate and washings.

The total product (24 parts) was recrystallized from 157.8 parts of absolute ethanol. The recrystallized product was washed once with 15.8 parts of absolute ethanol and twice with 24.8 parts of ether, and air-dried. The compound so prepared weighed 14 parts and melted with decomposition at 235° C.

*Analysis.*—Calcd. for $C_{12}H_{12}ClN_3OS$: N, 14.91. Calcd. for $C_{14}H_{14}ClN_3OS + \frac{1}{2}C_2H_5OH$: N, 13.79. Found: N, 14.15.

EXAMPLE 6

*1-(carboxymethyl)pyridinium chloride, hydrazide and hydrazone with 5-bromo-2-thiophenecarboxaldehyde*

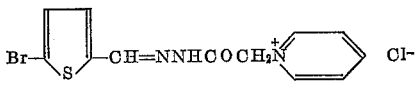

A hot solution consisting of 20.0 parts of Girard's P reagent, 197.3 parts of absolute ethanol, and 52.5 parts of glacial acetic acid was added to a hot solution consisting of 19.1 parts of 5-bromo-2-thiophenecarboxaldehyde and 19.7 parts of absolute ethanol. The resulting solution was heated at the temperature at which refluxing took place. Within a period of two minutes a crystalline precipitate separated from the reaction mixture. The resulting suspension was heated at about 100° C. for a period of one-half hour. The mixture was then cooled and the crystalline product was separated by filtration, collected, washed three times with 27.6 parts of absolute ethanol and twice with 24.8 parts of ether, and finally air-dried. The product thus obtained weighed 29 parts and melted at 234° C. with decomposition.

*Analysis.*—Calcd. for $C_{12}H_{11}BrClN_3OS$: N, 11.65. Found: N, 11.64.

EXAMPLE 7

Two parts of the alcoholic hemisolvate of 1-(carboxymethyl)pyridinium chloride, hydrazide and hydrazone with 2-thiophenecarboxaldehyde, prepared as in Example 5, was suspended in 87.9 parts of benzene to effect a removal of the alcohol of solvation. 53 parts of the benzene was removed by distillation through a packed column. The solid was separated from the residual suspension by filtration, collected, and air-dried. It had a melting point of 233° C. (with decomposition).

*Analysis.*—Calcd. for $C_{12}H_{12}N_3OSCl$: N, 14.91. Found: N, 14.90.

I claim:

1. A compound selected from the group consisting of thiophenecarboxaldehyde carboxymethyl quaternary ammonium halide hydrazide hydrazones represented by the formula

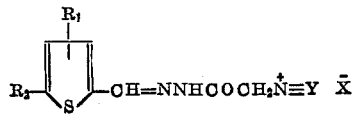

and their alcoholic solvates, where $R_1$ and $R_2$ are members of the class consisting of hydrogen, bromine, nitro, lower alkyl, radicals, $(N \equiv Y)$ is a quaternary ammonium radical selected from the group consisting of trimethylammonium, triethylammonium, phenyldimethylammonium, dimethylallylammonium, morpholinium and pyridinium and X is a member of the group consisting of chlorine and bromine.

2. The quaternary compound having the structural formula,

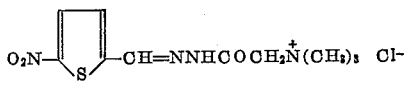

3. The quaternary compound having the structural formula,

4. The quaternary compound having the structural formula,

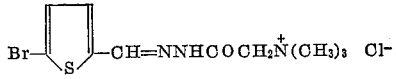

5. The quaternary compound having the structural formula,

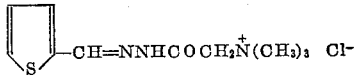

6. The quaternary compound having the structural formula,

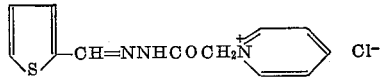

References Cited in the file of this patent

UNITED STATES PATENTS

| | | |
|---|---|---|
| 2,045,132 | Girard et al. | June 23, 1936 |
| 2,536,100 | Shappirio | Jan. 2, 1951 |

OTHER REFERENCES

Ward et al.: "J. Am. Pharm. Assoc." Sci. Ed. 37, 317–19 (1948).

Lederer: "Bull. Soc. Chim." France, vol. 13, Series 51946, p. 172.

Lederer et al.: "Bull. Soc. Chim." France 1949, pp. 400–02.

Lederer et al.: "Trav. Soc. Chim. Biol.," vol. 24 (1942), pp. 1144–54.